(12) United States Patent
Okada et al.

(10) Patent No.: US 11,933,726 B2
(45) Date of Patent: Mar. 19, 2024

(54) MEASUREMENT APPARATUS AND MEASUREMENT METHOD

(71) Applicant: YOKOGAWA ELECTRIC CORPORATION, Tokyo (JP)

(72) Inventors: Syuhei Okada, Musashino (JP); Hiroaki Tanaka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 230 days.

(21) Appl. No.: 17/600,475

(22) PCT Filed: Mar. 23, 2020

(86) PCT No.: PCT/JP2020/012785
§ 371 (c)(1),
(2) Date: Sep. 30, 2021

(87) PCT Pub. No.: WO2020/213350
PCT Pub. Date: Oct. 22, 2020

(65) Prior Publication Data
US 2022/0214275 A1    Jul. 7, 2022

(30) Foreign Application Priority Data

Apr. 15, 2019 (JP) .................................. 2019-077371

(51) Int. Cl.
*G01N 21/552* (2014.01)
*G01N 21/35* (2014.01)

(52) U.S. Cl.
CPC ........... *G01N 21/552* (2013.01); *G01N 21/35* (2013.01)

(58) Field of Classification Search
CPC .................. G01N 21/552; G01N 21/35; G01N 2021/8438; G01N 21/3563; G01N 21/3581; G01N 21/8422
See application file for complete search history.

(56) References Cited

U.S. PATENT DOCUMENTS

| 5,463,609 A | * | 10/1995 | Inagaki | G11B 5/58 369/112.28 |
| 2005/0200853 A1 | * | 9/2005 | Mori | G01N 21/553 356/445 |

(Continued)

FOREIGN PATENT DOCUMENTS

| JP | 2003-518617 A | 6/2003 |
| JP | 2005-17644 A | 1/2005 |

(Continued)

OTHER PUBLICATIONS

Indian Office Action dated Jan. 11, 2024 issued in Indian patent application No. 202117044370.

*Primary Examiner* — Jonathan M Hansen
(74) *Attorney, Agent, or Firm* — RANKIN, HILL & CLARK LLP

(57) ABSTRACT

A measurement apparatus includes a generator that causes electromagnetic waves to be incident on a sample, a receiver that receives electromagnetic waves reflected by the sample, and a controller that controls the generator and receiver. The sample includes a first layer on which the electromagnetic waves are incident and a second layer stacked on the first layer. The controller detects whether a third layer is present between the first and second layers based on the electromagnetic waves incident on the sample from the generator and the electromagnetic waves received by the receiver. The generator causes the electromagnetic waves to be incident at an angle such that the electromagnetic waves are totally reflected between the first and third layers and/or between the first and second layers.

13 Claims, 16 Drawing Sheets

(56) References Cited

U.S. PATENT DOCUMENTS

| | | | |
|---|---|---|---|
| 2006/0077391 A1* | 4/2006 | Kimura | G01N 21/553 |
| | | | 356/445 |
| 2015/0060697 A1* | 3/2015 | Umetsu | G01N 21/648 |
| | | | 359/833 |
| 2015/0211989 A1 | 7/2015 | Van Mechelen | |
| 2017/0074804 A1 | 3/2017 | Takayanagi et al. | |

FOREIGN PATENT DOCUMENTS

| | | |
|---|---|---|
| JP | 2013-507640 A | 3/2013 |
| JP | 2013-195203 A | 9/2013 |
| JP | 2014-77672 A | 5/2014 |
| JP | 5684819 B2 | 3/2015 |
| JP | 2016-14561 A | 1/2016 |
| JP | 2016-537630 A | 12/2016 |
| JP | 2019-20147 A | 2/2019 |
| WO | 01/48457 A1 | 7/2001 |
| WO | 2009/133853 A1 | 11/2009 |
| WO | 2011/047016 A1 | 4/2011 |
| WO | 2015/073807 A1 | 5/2015 |

\* cited by examiner

MEASUREMENT APPARATUS AND MEASUREMENT METHOD

CROSS-REFERENCE TO RELATED APPLICATION

The present application claims priority to Japanese Patent Application No. 2019-77371 filed on Apr. 15, 2019, the entire contents of which are incorporated herein by reference.

TECHNICAL FIELD

The present disclosure relates to a measurement apparatus and a measurement method.

BACKGROUND

A method to measure the state of adhesion between layers by measuring the reflection or transmission of terahertz waves in a sample with a plurality of layers is known. For example, see patent literature (PTL) 1.

CITATION LIST

Patent Literature

PTL 1: JP 5684819 B2

SUMMARY

Technical Problem

Improvement in the measurement accuracy of the state of adhesion between layers is desired.

It is an aim of the present disclosure to provide a measurement apparatus and a measurement method that can improve the measurement accuracy of the state of adhesion between layers.

Solution to Problem

A measurement apparatus according to an embodiment includes a generator configured to cause an electromagnetic wave to be incident on a sample; a receiver configured to receive an electromagnetic wave reflected by the sample; and a controller configured to control the generator and the receiver. The sample includes a first layer on which the electromagnetic wave is incident and a second layer stacked on the first layer, the controller is configured to detect whether the third layer is present between the first layer and the second layer based on the electromagnetic wave incident on the sample from the generator and the electromagnetic wave received by the receiver, and the generator is configured to cause the electromagnetic wave to be incident at an angle such that the electromagnetic wave is totally reflected between the first layer and the third layer and/or between the first layer and the second layer. In this way, an evanescent wave (near-field light) localized in the region of approximately the wavelength of the electromagnetic wave enables detection of the third layer, located near the interface between the first and second layers, with a depth resolution equal to or less than the wavelength of the electromagnetic wave. The measurement accuracy of the state of adhesion between layers can thereby be improved.

The measurement apparatus according to an embodiment may further include a displacer configured to displace at least one of the first layer and the second layer in a direction away from the other. In this way, the measurement apparatus can judge whether the sample is in a full contact state or a tightly adhered state. The measurement accuracy of the state of adhesion between layers can thereby be improved.

In the measurement apparatus according to an embodiment, the displacer may be configured to vibrate at least one of the first layer and the second layer. In this way, the measurement apparatus can judge, with a simple configuration, whether the sample is in a full contact state or a tightly adhered state. The measurement accuracy of the state of adhesion between layers can thereby be improved.

In the measurement apparatus according to an embodiment, the displacer may be configured to apply a force to at least one of the first layer and the second layer in a direction away from the other. In this way, the accuracy of determining whether the sample is in a full contact state or a tightly adhered state improves. The measurement accuracy of the state of adhesion between layers can thereby be improved.

In the measurement apparatus according to an embodiment, the controller may be configured to calculate the area over which the first layer and the third layer are in contact based on the electromagnetic wave incident on the sample from the generator and the electromagnetic wave received by the receiver. In this way, the detection accuracy of the third layer can be improved. The measurement accuracy of the state of adhesion between layers can thereby be improved.

In the measurement apparatus according to an embodiment, the controller may be configured to calculate the thickness of the third layer based on the electromagnetic wave incident on the sample from the generator and the electromagnetic wave received by the receiver. In this way, the detection accuracy of the third layer can be improved. The measurement accuracy of the state of adhesion between layers can thereby be improved.

In the measurement apparatus according to an embodiment, the controller may be configured to simultaneously calculate the area over which the first layer and the third layer are in contact and the thickness of the third layer based on the electromagnetic wave incident on the sample from the generator and the electromagnetic wave received by the receiver. In this way, the time required to detect the third layer may be reduced.

The measurement apparatus according to an embodiment may further include at least one of an incidence angle adjuster located between the generator and the first layer and an exit angle adjuster located between the receiver and the first layer. When the measurement apparatus includes the incidence angle adjuster, a simple configuration enables the angle of incidence on the first layer to satisfy the total reflection condition more easily. When the measurement apparatus includes the exit angle adjuster, loss of the electromagnetic wave can be reduced.

A measurement method according to an embodiment includes causing an electromagnetic wave to be incident on a sample including a first layer and a second layer that are stacked, the electromagnetic wave being incident on the first layer; receiving an electromagnetic wave reflected by the sample; and detecting whether the third layer is present between the first layer and the second layer based on the electromagnetic wave that is caused to be incident on the sample and the electromagnetic wave that is received. The causing of the electromagnetic wave to be incident includes causing the electromagnetic wave to be incident on the first layer at an angle such that the electromagnetic wave is totally reflected between the first layer and the third layer and/or between the first layer and the second layer. In this way, an evanescent wave (near-field light) localized in the region of approximately the wavelength of the electromagnetic wave enables detection to a depth equal to or less than the wavelength of the electromagnetic wave, i.e. detection of the state near the interface between the first and second layers with a depth resolution equal to or less than the wavelength. The measurement accuracy of the state of adhesion between layers can thereby be improved.

Advantageous Effect

According to the present disclosure, a measurement apparatus and a measurement method that can improve the measurement accuracy of the state of adhesion between layers are provided.

DETAILED DESCRIPTION

Comparative Example

Various methods can be considered for measuring samples. As a comparative example, the amount of functional groups contained a sample can be measured by infrared light (IR), for example. However, IR is easily absorbed by materials. It is therefore easy to use IR to measure the surface or near-surface of a sample, but not the interior of a sample. IR is thus difficult to use for measuring the state of adhesion between a plurality of layers contained in a sample.

As a comparative example, X-rays, ultrasound, or laser ultrasound can be used to measure the voids present inside a sample. The use of X-rays, however, entails a risk of exposure and also requires large equipment. Ultrasound or laser ultrasound has the problem of depth resolution being on the order of several hundred micrometers, depending on the measurement conditions. Considering how the adhesive strength between a plurality of layers contained in a sample can be reduced by voids on the order of several micrometers, X-rays, ultrasound, or laser ultrasound, which only have a low depth resolution, are difficult to use for measuring the state of adhesion between layers.

As a comparative example, the thickness of each layer in a sample containing a base material and an adhesive layer can be measured by analyzing the time waveform of the terahertz wave reflection. However, when the pulse width of the terahertz wave is approximately 1 picosecond (psec), it is impossible to discern whether the reflected wave is reflected at the surface of the base material or at the adhesive interface unless the distance between each layer is a hundred and several tens of micrometers or more. In other words, the depth resolution of the reflected wave is low. Considering how the adhesive strength between a plurality of layers contained in a sample can be reduced by voids on the order of several micrometers, a method based on analysis of the time waveform of the reflection of terahertz waves, which only has a low depth resolution, is difficult to use for measuring the state of adhesion between layers.

As described above, problems arise in the possible comparative examples for measuring samples, such as the depth resolution of the measurement being on the order of 100 μm or more, or safety being at risk. To measure the state of adhesion between layers with high accuracy, measurement of the sample with high depth resolution is required. The ability to measure safely is also required.

Therefore, the present disclosure describes a measurement apparatus 1 (see FIG. 1) and a measurement method that can measure the state of adhesion between layers with high accuracy and without increasing safety-related risks.

Embodiments

Figure 1:
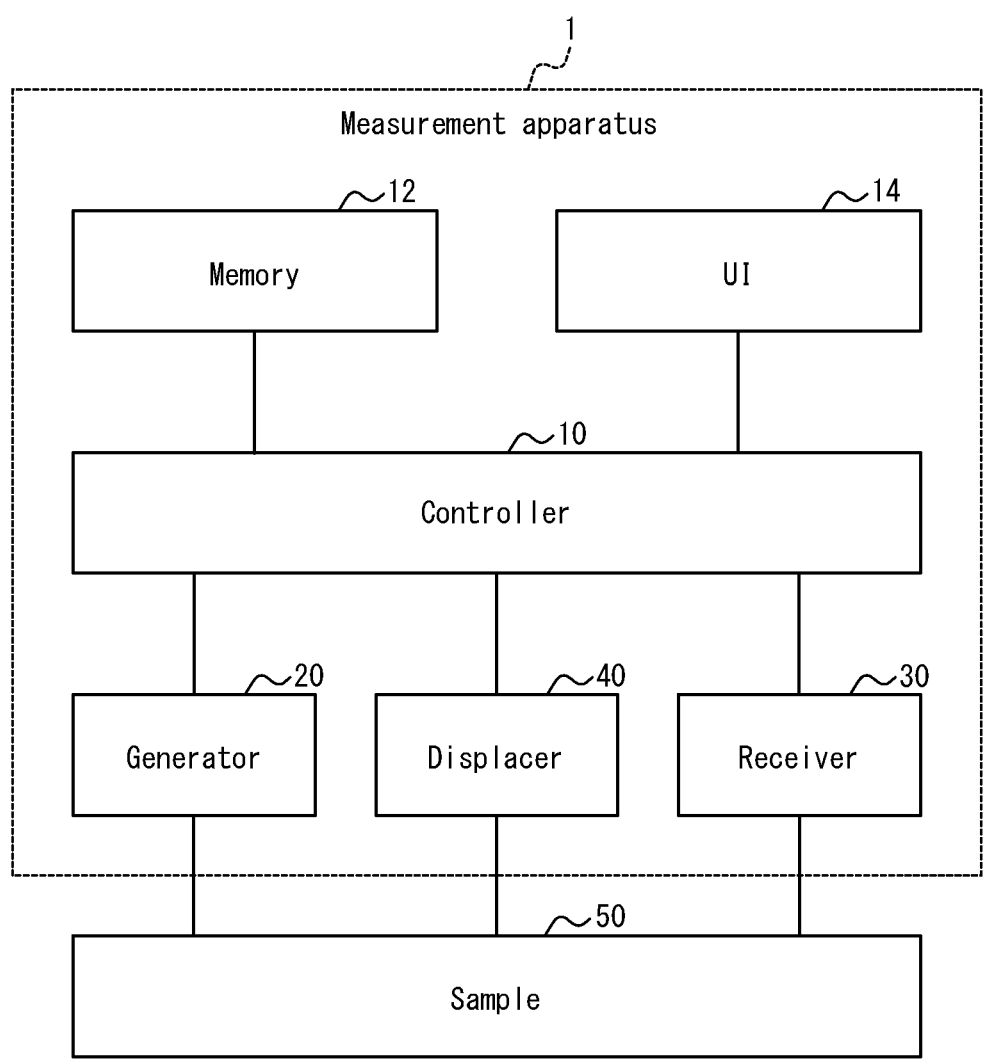
FIG. 1 is a block diagram illustrating an example configuration of a measurement apparatus according to an embodiment.
Figure 2:
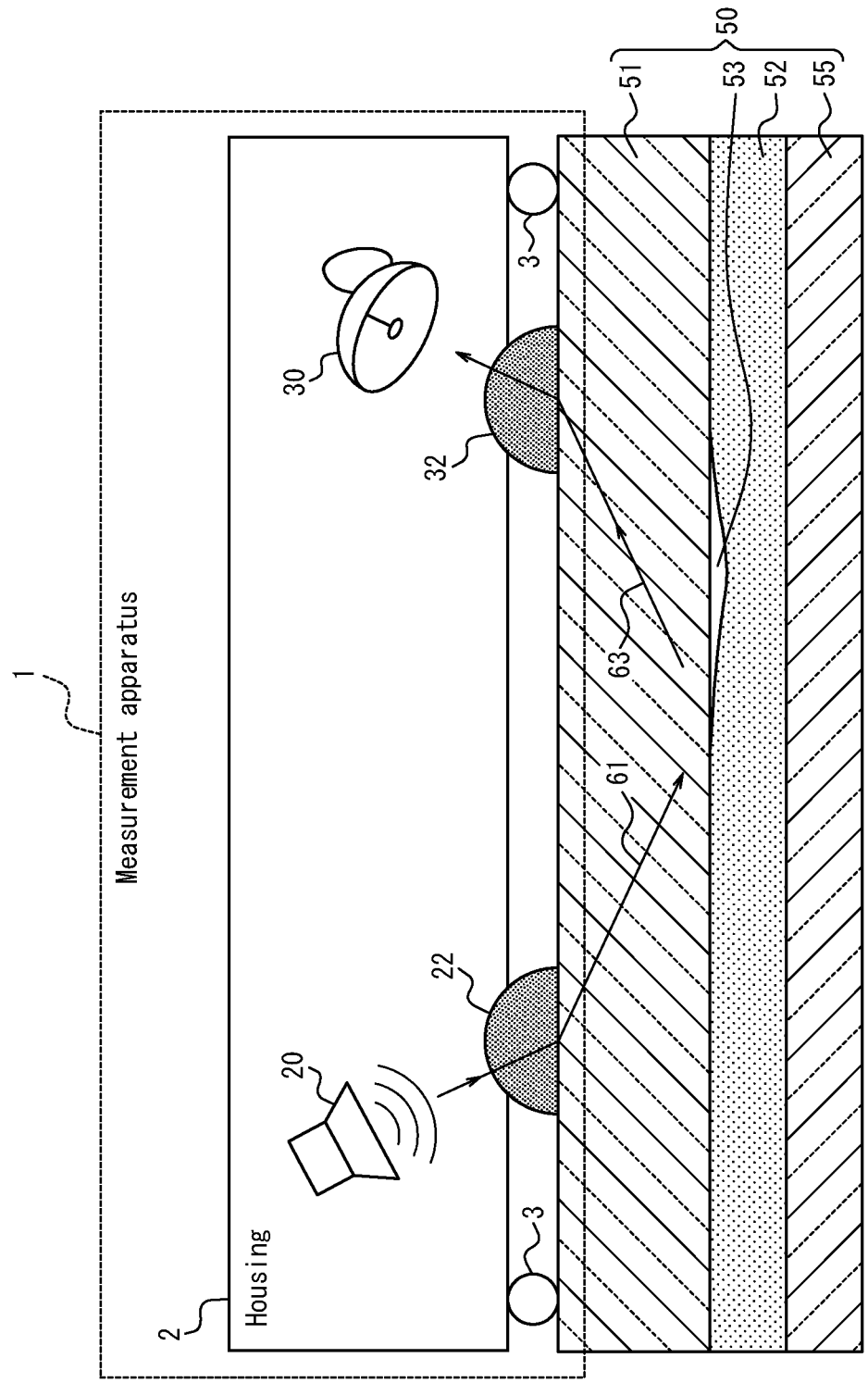
FIG. 2 is a cross-sectional diagram illustrating an example configuration of a measurement apparatus according to an embodiment.

As illustrated in FIGS. 1 and 2, a measurement apparatus 1 according to an embodiment of the present disclosure includes a controller 10, a generator 20, and a receiver 30. In the measurement apparatus 1, the generator 20 generates electromagnetic waves, and the electromagnetic waves are incident on a sample 50. The electromagnetic waves are reflected by the sample 50 and are incident on the receiver 30. The measurement apparatus 1 receives the electromagnetic waves reflected by the sample 50 with the receiver 30 and detects the intensity of the electromagnetic waves. The measurement apparatus 1 measures information regarding the sample 50 based on the intensity of the electromagnetic waves generated by the generator 20 and the intensity of the electromagnetic waves received by the receiver 30.

The generator 20 may generate terahertz waves as electromagnetic waves. Terahertz waves are electromagnetic waves having a frequency between 0.1 THz and 10 THz. The generator 20 may generate millimeter waves as electromagnetic waves. Millimeter waves are electromagnetic waves having a wavelength between 1 mm and 10 mm. Terahertz waves or millimeter waves penetrate into the sample 50 more easily than IR. The terahertz waves or millimeter waves that penetrate into the sample 50 contain information regarding the absorption spectrum of the material contained in the sample 50. Terahertz or millimeter waves do not pose the same exposure risk as X-rays. The generator 20 is also referred to as a generation device.

The receiver 30 may receive the electromagnetic waves reflected by the sample 50 and detect the intensity of the electromagnetic waves. In other words, the measurement apparatus 1 may analyze the sample 50 based on the intensity of the totally reflected electromagnetic waves. The measurement apparatus 1 may analyze the sample 50 using, for example, attenuated total reflection (ATR). ATR enables the measurement apparatus 1 to analyze information in a region from the surface where an electromagnetic wave is totally reflected to a depth shorter than the wavelength. In other words, the measurement apparatus 1 can analyze the information in the sample 50 in a depth region shorter than the wavelength, i.e., near the interface. If the electromagnetic wave is a terahertz wave, the information in the depth direction of the sample 50 can be analyzed on the order of several micrometers to several hundred micrometers. If the electromagnetic wave is a millimeter wave, the information in the depth direction of the sample 50 can be analyzed on the order of several hundred micrometers to several millimeters. The receiver 30 is also referred to as a reception device.

The measurement apparatus 1 may further include a displacer 40. The displacer 40 displaces at least a portion of the sample 50, as described below. The displacer 40 may, for example, be configured to apply an external force, such as a tensile force, to the sample 50. The displacer 40 may, for example, be configured to apply vibration to the sample 50. The measurement apparatus 1 may analyze information on the sample 50 while at least a portion of the sample 50 is deformed by the displacer 40.

The controller 10 acquires information from the components of the measurement apparatus 1 and controls the components. The controller 10 may include a processor such as a central processing unit (CPU). The controller 10 may implement the various functions of the measurement apparatus 1 by executing a predetermined program.

The measurement apparatus 1 may further include a memory 12. The memory 12 may store various information used for operations of the measurement apparatus 1, programs for implementing the functions of the measurement apparatus 1, and the like. The memory 12 may function as a working memory of the controller 10. The memory 12 may, for example, be a semiconductor memory. The memory 12 may be included in the controller 10.

The measurement apparatus 1 may further include a user interface (UI) 14. The UI 14 may include an input device, such as a mouse or other pointing device, physical keys, or a touch panel, that accepts operation input from a user. The UI 14 may include a display device, such as a display or a light emitting element, that displays information to report to the user. The UI 14 may include a sound device, such as a speaker, that outputs audio for reporting information to the user. The UI 14 is not limited to the above examples and may include various other devices.

The measurement apparatus 1 may include a housing 2 that holds the generator 20 and the receiver 30. The measurement apparatus 1 may include tires 3 to enable movement over the surface of the sample 50. The tires 3 may be replaced by another moving means. The moving means may, for example, be configured by a combination of a guide rail and a servo motor or a linear motor. The moving means is not limited to these examples and may be replaced by various other means. The measurement apparatus 1 may further include an incidence angle adjuster 22 located between the generator 20 and the sample 50. The measurement apparatus 1 may further include an exit angle adjuster 32 located between the receiver 30 and the sample 50.

The sample 50 includes a first layer 51, a second layer 52, and a substrate 55. The first layer 51, the second layer 52, and the substrate 55 are stacked. The first layer 51 is also referred to as the base material. The second layer 52 adheres the first layer 51 (base material) and the substrate 55. The second layer 52 is also referred to as the adhesive layer. The first layer 51 and the substrate 55 may be formed from various materials, including but not limited to glass. The second layer 52 may be formed from various materials, including but not limited to an adhesive made of resin or the like.

The first layer 51 and the second layer 52 are at least partially in contact. A void may be present, however, in a part of the area between the first layer 51 and the second layer 52. The void is represented as the third layer 53. The void can easily form when the adhesive strength between the first layer 51 and the second layer 52 is low. Put another way, the presence of a void between the first layer 51 and the second layer 52 decreases the adhesive strength between the first layer 51 and the second layer 52. The refractive index of the first layer 51 is represented as n1. The refractive index of the second layer 52 is represented as n2. The refractive index of the third layer 53 is represented as n3. The refractive index of the air filling the void may be considered to be 1. Therefore, the refractive index (n3) of the third layer 53 will be considered to be 1. In the present embodiment, it is assumed that the refractive index (n1) of the first layer 51 is greater than the refractive index (n2) of the second layer 52. In other words, it is assumed that the relationship n1>n2 holds. The third layer may be a substance other than air, such as water, oil, or any other substance.

The electromagnetic wave incident on the sample 50 from the generator 20 is referred to as an incident electromagnetic wave 61. The incident electromagnetic wave 61 is incident on the first layer 51. The angle of incidence of the incident electromagnetic wave 61 is expressed as the angle between the normal direction of the surface of the first layer 51 and the travel direction of the incident electromagnetic wave 61. The incident electromagnetic wave 61 incident on the first layer 51 is reflected at the surface of the second layer 52 or the surface of the third layer 53. The electromagnetic wave reflected at the surface of the second layer 52 or the surface of the third layer 53 is referred to as a reflected electromagnetic wave 63. The reflected electromagnetic wave 63 exits from the first layer 51 towards the receiver 30.

When n1>n2 holds, electromagnetic waves are incident from the first layer 51 on the second layer 52 at an angle greater than the critical angle, resulting in total reflection at the interface between the first layer 51 and the second layer 52. The critical angle representing the total reflection condition when electromagnetic waves are incident from the first layer 51 on the second layer 52 is represented by $\theta_{C12}$. The relationship $\sin \theta_{C12}=n2/n1$ holds between the refractive index of the first layer 51 and second layer 52 and the critical angle.

The incidence angle adjuster 22 adjusts the angle of incidence of the incident electromagnetic wave 61 so that the angle of incidence satisfies the total reflection condition. The refractive index of the incidence angle adjuster 22 may be made larger than the refractive index of the first layer 51. By doing so, the angle between the travel direction of the electromagnetic wave incident on the first layer 51 from the incidence angle adjuster 22 and the normal direction of the first layer 51 becomes larger than the angle between the travel direction of the electromagnetic wave in the incidence angle adjuster 22 and the normal direction of the first layer 51. Consequently, the angle of incidence of the incident electromagnetic wave 61 from the first layer 51 to the second layer 52 or the third layer 53 tends to become larger than the angle of incidence from the incidence angle adjuster 22 on the first layer 51. The incidence angle adjuster 22 may have a hemispherical surface as the incident surface on the side where the electromagnetic waves are incident from the generator 20. By the electromagnetic waves being incident perpendicularly or substantially perpendicularly to the hemispherical incident surface, the loss due to reflection of the electromagnetic waves at the incident surface can be reduced. Furthermore, by enabling electromagnetic waves traveling in various directions to be incident perpendicularly or substantially perpendicularly to the hemispherical incident surface, the measurement apparatus 1 can easily control the angle of incidence of the incident electromagnetic wave 61 from the first layer 51 to the second layer 52 or the third layer 53 over a wide range. Consequently, with a simple configuration, the angle of incidence of the incident electromagnetic wave 61 on the first layer 51 can easily satisfy the total reflection condition at the interface with the second layer 52 or the third layer 53.

The exit angle adjuster 32 adjusts the travel direction of the reflected electromagnetic wave 63 so that the reflected electromagnetic wave 63 can propagate to the receiver 30. The refractive index of the exit angle adjuster 32 may be made larger than the refractive index of the first layer 51. By doing so, the travel direction of the reflected electromagnetic wave 63 traveling from the first layer 51 to the exit angle adjuster 32 approaches the normal direction of the first layer 51. It thereby becomes easier for the receiver 30 to receive the reflected electromagnetic wave 63. The exit angle adjuster 32 may have a hemispherical shape on the side that emits the electromagnetic wave towards the receiver 30. In this way, regardless of the direction in which the reflected electromagnetic wave 63 travels, the reflected electromagnetic wave 63 can be received by the receiver 30, and the exit angle of the electromagnetic wave emitted from the surface of the exit angle adjuster 32 can be reduced. Consequently, the loss of electromagnetic waves at the surface of the exit angle adjuster 32 can be reduced.

In the measurement apparatus 1, the space between the surface of the first layer 51 and the incidence angle adjuster 22 and exit angle adjuster 32 may be filled with a liquid having a higher refractive index than that of air. This makes it easier for electromagnetic waves to enter the first layer 51 from the incidence angle adjuster 22 and to exit from the first layer 51 to the exit angle adjuster 32. The liquid may include water, for example, or a liquid with a high refractive index. In the measurement apparatus 1, the space between the surface of the first layer 51 and the generator 20 and receiver 30 may be filled with a liquid having a higher refractive index than that of air. In this way, the measurement apparatus 1 can easily adjust the angle of incidence without including the incidence angle adjuster 22 and the exit angle adjuster 32.

Figure 3:
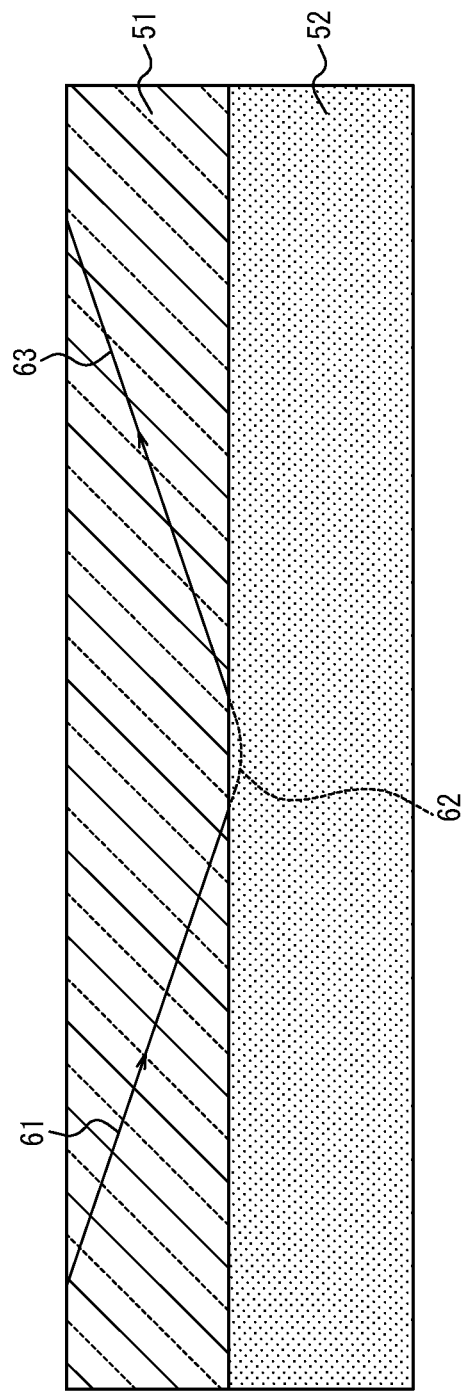
FIG. 3 is a cross-sectional diagram illustrating total reflection between first and second layers.

As illustrated in FIG. 3, when an electromagnetic wave is totally reflected at the surface of the second layer 52, the electromagnetic wave seeps out from the surface of the second layer 52 as an evanescent wave 62 in a predetermined range of depth. The predetermined depth to which the evanescent wave 62 seeps is also referred to as the seeping depth. The incident electromagnetic wave 61 is converted into the reflected electromagnetic wave 63 through the state of the evanescent wave 62. The intensity of the evanescent wave 62 decays exponentially with depth from the surface of the second layer 52. The seeping depth of the evanescent wave 62 may be the depth at which the intensity of the evanescent wave 62 becomes an inverse multiple of the natural logarithm. When the natural logarithm is represented by e, the seeping depth may be the depth at which the intensity of the evanescent wave 62 becomes a multiple of 1/e.

Electromagnetic waves are attenuated by their interaction with matter. In other words, electromagnetic waves are absorbed by matter. The absorption rate of an electromagnetic wave depends on the frequency of the electromagnetic wave. The relationship between the frequency and the absorption rate of the electromagnetic wave at each frequency is expressed as an absorption spectrum. The absorption spectrum is determined based on physical property parameters such as the composition or density of the material that absorbs the electromagnetic wave, or the bonding state of the atoms or molecules in the material.

The incident electromagnetic wave 61 and the reflected electromagnetic wave 63 are absorbed by the first layer 51 based on the absorption spectrum of the first layer 51. The absorption rate of the electromagnetic wave in the first layer 51 increases with the distance over which the electromagnetic wave propagates through the first layer 51. As the angle of incidence of the electromagnetic wave is greater, the distance over which the electromagnetic wave propagates through the first layer 51 is greater. Consequently, the absorption rate included in the absorption spectrum of the first layer 51 increases.

The evanescent wave 62 is absorbed by the second layer 52 based on the absorption spectrum of the second layer 52. When the electromagnetic wave is totally reflected at the second layer 52, the absorption spectrum of the second layer 52 is also referred to as the total reflection absorption spectrum of the second layer 52. The difference between the spectrum of the electromagnetic wave incident on the sample 50 from the generator 20 and the spectrum of the electromagnetic wave received by the receiver 30 corresponds to the absorption spectrum of the sample 50. The absorption spectrum of the sample 50 includes the absorption spectrum of the first layer 51 and the total reflection absorption spectrum of the second layer 52.

Figure 4:
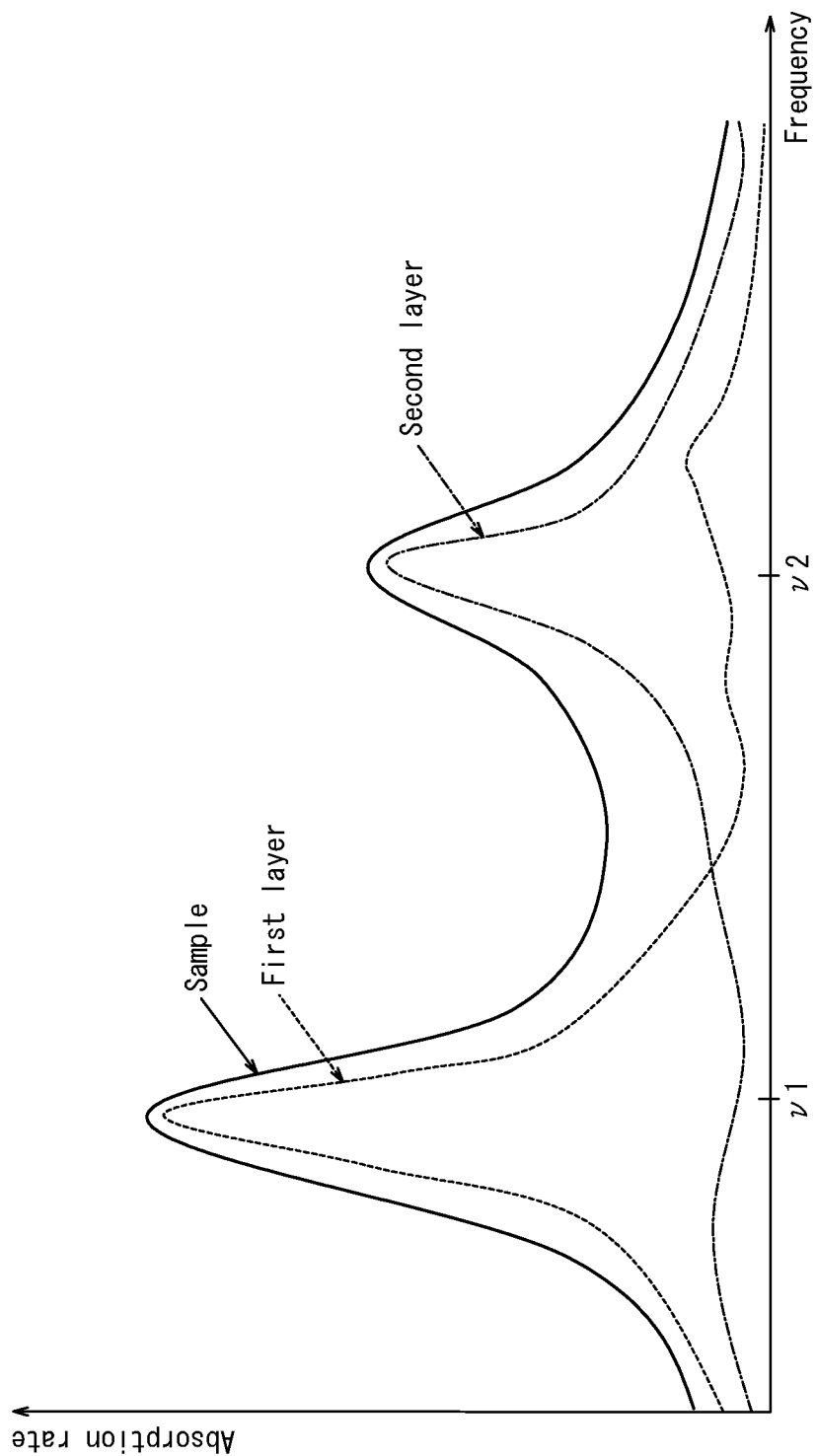
FIG. 4 is a graph illustrating an example of the absorption spectrum of a sample.

An example of the absorption spectrum in the sample 50 is illustrated as a graph in FIG. 4. In the graph of FIG. 4, the horizontal axis represents the frequency of the electromagnetic wave. The vertical axis represents the absorption rate of the electromagnetic wave at each frequency. The absorption spectrum of the sample 50 is represented by a solid line. The absorption spectrum of the first layer 51 is represented by a dashed line. The total reflection absorption spectrum of the second layer 52 is represented by a dashed dotted line.

The absorption spectrum of the first layer 51 has a peak at a first frequency, represented by ν1. The total reflection absorption spectrum of the second layer 52 has a peak at a second frequency, represented by ν2. The absorption spectrum of the sample 50 has peaks at ν1 and ν2.

The absorption spectrum of the sample 50 can be expressed as the sum of the absorption spectrum of the first layer 51 and the total reflection absorption spectrum of the second layer 52. The absorption rate of each frequency in the sample 50 can be expressed as the sum of the absorption rate of each frequency in the first layer 51 and the absorption rate of each frequency in the second layer 52. If the absorption spectrum of the first layer 51 is known, the measurement apparatus 1 can calculate the total reflection absorption spectrum of the second layer 52 as the difference between the measured absorption spectrum of the sample 50 and the absorption spectrum of the first layer 51. The absorption spectrum of the first layer 51 is also referred to as a reference spectrum. The measurement apparatus 1 may acquire the reference spectrum in advance from a material database or the like. The measurement apparatus 1 may acquire the absorption spectrum obtained by total reflection of the electromagnetic wave at the interface between the first layer 51 and the air as the reference spectrum. The measurement apparatus 1 may correct the reference spectrum based on the angle of incidence of the electromagnetic wave. The measurement apparatus 1 may acquire the reference spectrum for each angle of incidence of the electromagnetic wave. The measurement apparatus 1 may store the angle of incidence of the electromagnetic wave and the reference spectrum corresponding to that angle of incidence in the memory 12 as a table. The reference spectrum may be corrected in accordance with the thickness of the first layer 51.

When the third layer 53 is present between the first layer 51 and the second layer 52, electromagnetic waves may be incident from the first layer 51 on the third layer 53. The electromagnetic waves are totally reflected at the interface between the first layer 51 and the third layer 53 by being incident from the first layer 51 on the third layer 53 at an angle greater than the critical angle. The critical angle representing the total reflection condition when electromagnetic waves are incident from the first layer 51 on the third layer 53 is represented by $\theta_{C13}$. The relationship $\sin\theta_{C13}=1/n1$ holds between the refractive index of the first layer 51 and the critical angle.

Figure 5:
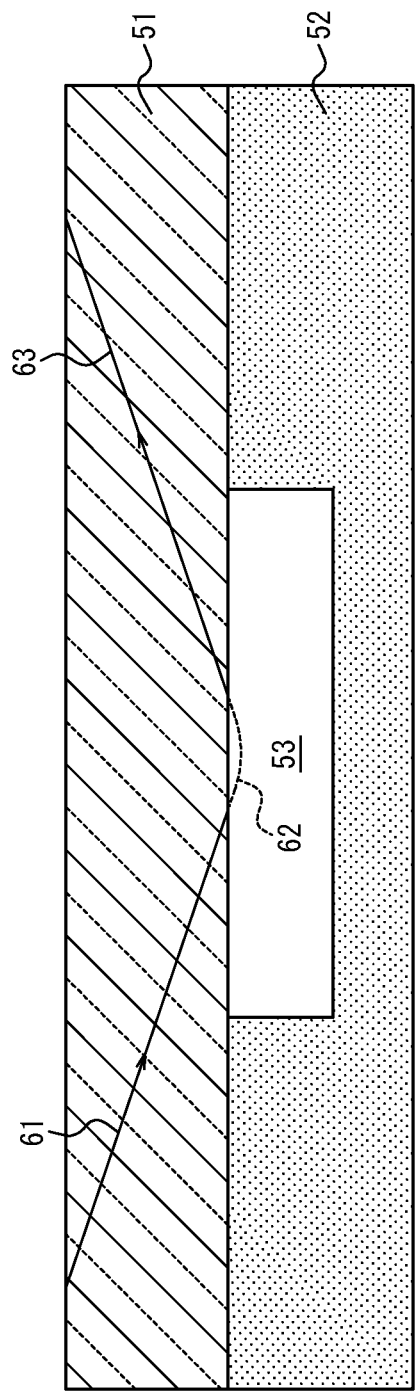
FIG. 5 is a cross-sectional diagram illustrating total reflection between first and third layers.
Figure 6:
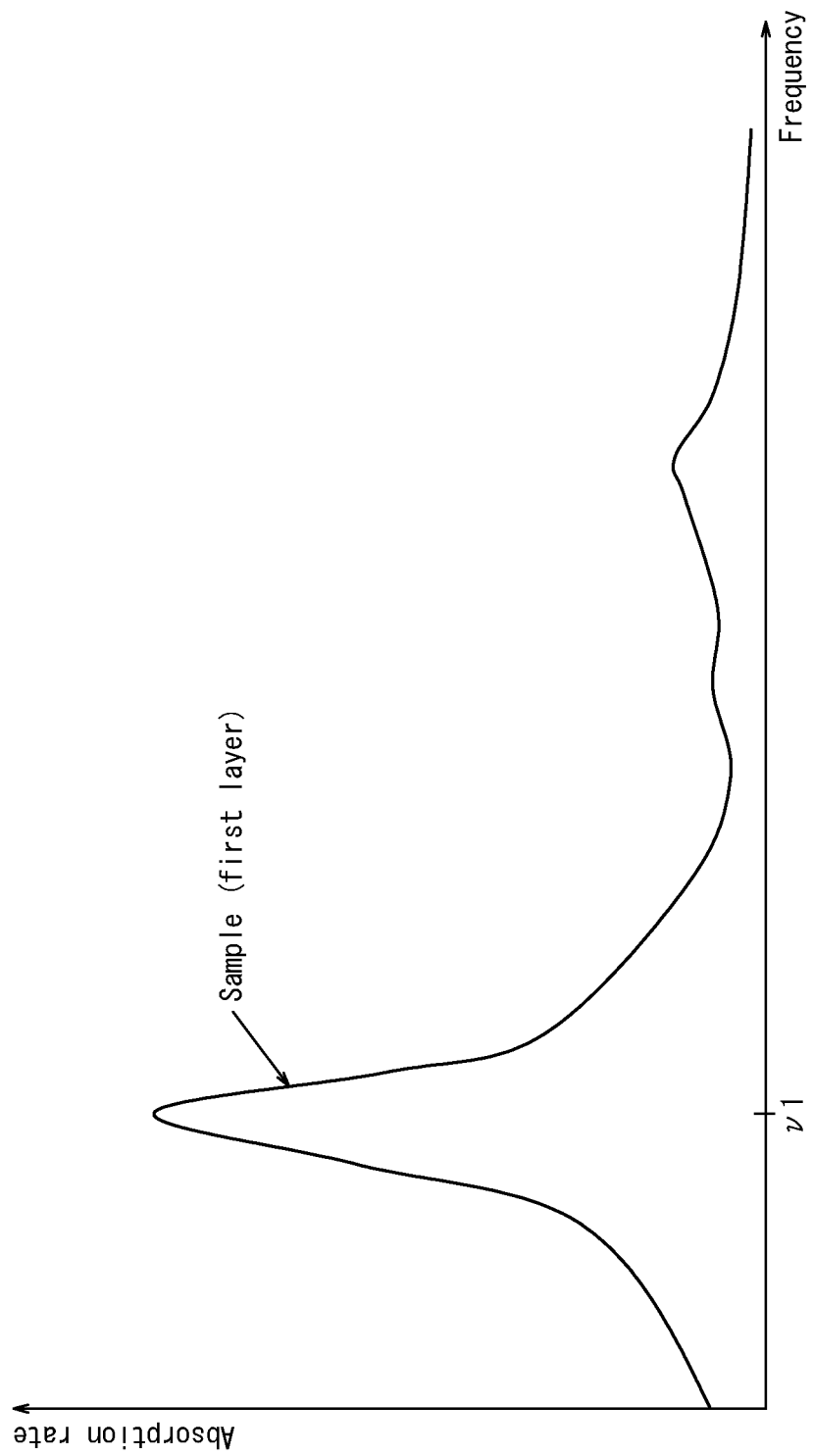
FIG. 6 is a graph illustrating an example of the absorption spectrum of the first layer.

As illustrated in FIG. 5, when an electromagnetic wave is totally reflected at the surface of the third layer 53, the electromagnetic wave seeps out from the surface of the third layer 53 as an evanescent wave 62 in a predetermined range of depth. The evanescent wave 62 is absorbed by the third layer 53 based on the unique absorption spectrum of the third layer 53. When the third layer 53 is a void, the absorption of electromagnetic waves in the third layer 53 is negligibly small compared to the absorption of electromagnetic waves in the first layer 51 and second layer 52. Therefore, when electromagnetic waves are totally reflected at the surface of the third layer 53, the absorption spectrum of the sample 50 is represented only by the absorption spectrum of the first layer 51, as illustrated in FIG. 6. The horizontal and vertical axes of the graph in FIG. 6 are the same as the horizontal and vertical axes of the graph in FIG. 4.

When the spectrum illustrated in the graph of FIG. 4 is obtained as the absorption spectrum of the sample 50, the measurement apparatus 1 may judge that the electromagnetic wave was totally reflected by the second layer 52. When the spectrum illustrated in the graph of FIG. 6 is obtained as the absorption spectrum of the sample 50, the measurement apparatus 1 may judge that the electromagnetic wave was totally reflected by the third layer 53. In other words, the measurement apparatus 1 can judge whether the third layer 53 is present in the portion where the electromagnetic wave is totally reflected based on the measurement result of the absorption spectrum of the sample 50.

The measurement apparatus 1 may calculate the absorption rate for each frequency included in the predetermined range and calculate the absorption spectrum of the sample 50 as the measurement result. The measurement apparatus 1 may calculate the absorption rate of a predetermined frequency as the measurement result. For example, the measurement apparatus 1 may calculate the absorption rate of the second frequency represented by ν2 as the measurement result. The measurement apparatus 1 may judge whether the third layer 53 is present based on the absorption rate of the predetermined frequency.

As described above, the measurement apparatus 1 according to the present embodiment judges whether the third layer 53 is present based on the reflection absorption spectrum identified by the absorption rate of the evanescent wave 62 in the second layer 52. With this approach, the presence of the third layer 53 is detected in a depth region of approximately the seeping depth of the evanescent wave 62, i.e., deeper than the wavelength of the electromagnetic wave. The measurement accuracy of the state of adhesion between the first layer 51 and the second layer 52 thereby improves. In addition, since the refractive index of the first layer 51 is larger than the refractive index of the second layer 52, the incident electromagnetic wave 61 is totally reflected regardless of whether the third layer 53 is present. This increases the intensity of the reflected electromagnetic wave 63. Consequently, the measurement apparatus 1 can calculate the reflection absorption spectrum with high accuracy and can also detect the presence of the third layer 53 with high accuracy.

<Calculation of Area and Thickness of Void>

Figure 7:
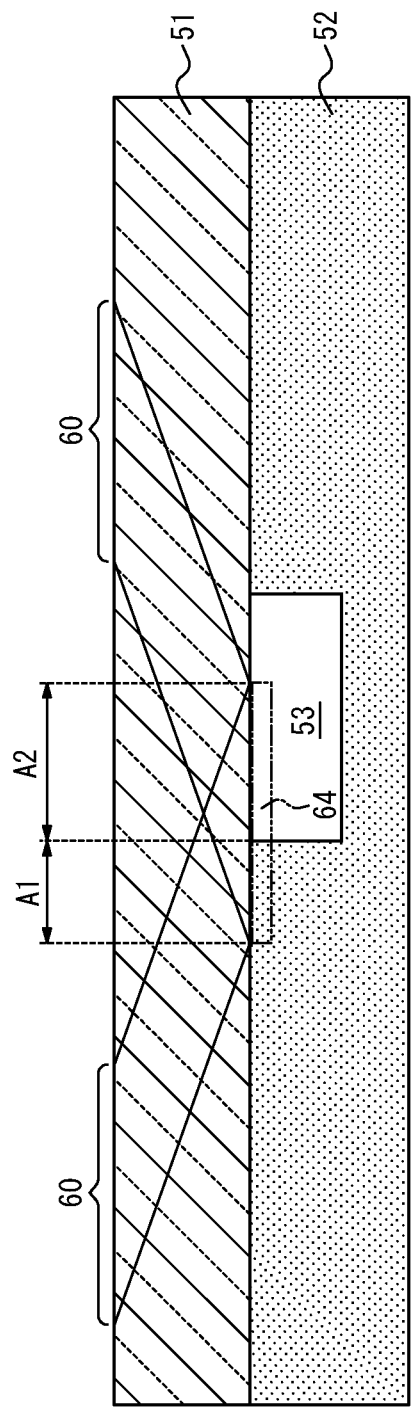
FIG. 7 is a cross-sectional diagram illustrating an example of a configuration in which an electromagnetic wave beam is totally reflected across second and third layers that are aligned in the in-plane direction of a sample.

The electromagnetic wave that the measurement apparatus 1 causes to be incident on the sample 50 has a predetermined spread. The electromagnetic wave with a predetermined spread is represented as an electromagnetic wave beam 60, as illustrated in FIG. 7. The electromagnetic wave beam 60 is incident on the sample 50, is totally reflected inside, and is emitted from the sample 50. When the electromagnetic wave beam 60 is incident on the second layer 52 or the third layer 53 and is totally reflected, an evanescent field 64 is produced on the surface of the second layer 52 or the third layer 53. The surface of the first layer 51 and the surface of the second layer 52 are assumed to be parallel. In this case, the area of the region where the evanescent field 64 is produced is equivalent to the incident area and the emission area of the electromagnetic wave beam 60 at the surface of the first layer 51.

The absorption spectrum of the electromagnetic wave beam 60 in the sample 50 is determined based on the ratio of electromagnetic waves that are totally reflected at the second layer 52 to electromagnetic waves that are totally reflected at the third layer 53. For example, if the evanescent field 64 extends across the second layer 52 and the third layer 53, as illustrated in FIG. 7, the absorption spectrum of the electromagnetic wave beam 60 is determined based on the ratio between the respective areas of the evanescent field 64 extending across the second layer 52 and the third layer 53. The respective areas of the evanescent field 64 extending across the second layer 52 and the third layer 53 are represented as A1 and A2. The sum of A1 and A2 corresponds to the area over which the electromagnetic wave beam 60 spreads. For example, the absorption rate of an electromagnetic wave with a frequency of v2 when the evanescent field 64 extends across the second layer 52 and the third layer 53 is A1/(A1+A2) times the absorption rate when the evanescent field 64 only extends over the second layer 52. The case of the evanescent field 64 only extending over the second layer 52 is referred to as ref. The case of the evanescent field 64 extending across the second layer 52 and the third layer 53 is referred to as case 1. In other words, the absorption rate in case 1 for an electromagnetic wave with frequency v2 is A1/(A1+A2) times the absorption rate of ref.

Figure 8:
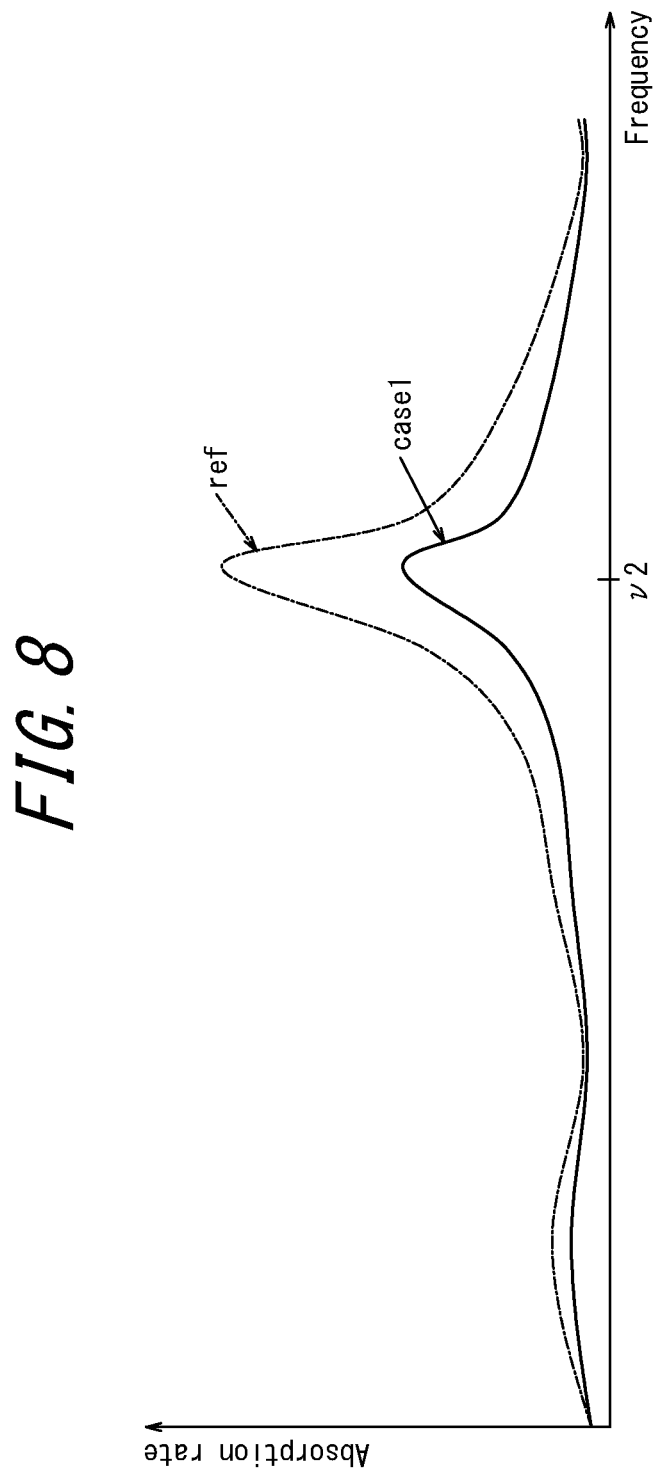
FIG. 8 is a graph illustrating an example of the total reflection absorption spectrum measured by the configuration example in FIG. 7.

The absorption rate in case 1 is A1/(A1+A2) times the absorption rate of ref not only for electromagnetic waves whose frequency is v2, but also for electromagnetic waves of other frequencies. As illustrated in FIG. 8, the total reflection absorption spectrum for case 1 can be expressed as the spectrum yielded by transforming the total reflection absorption spectrum for ref by a multiple of A1/(A1+A2) in the vertical axis direction. The horizontal and vertical axes of the graph in FIG. 8 are the same as the horizontal and vertical axes of the graph in FIG. 4. The total reflection absorption spectrum for ref is the same spectrum as the total reflection absorption spectrum of the second layer 52 illustrated in FIG. 4.

The absorption spectrum of the electromagnetic wave beam 60 is determined based on the ratio between A1 and A2. In other words, the measurement apparatus 1 can calculate the ratio between A1 and A2 based on the measurement result of the absorption spectrum of the electromagnetic wave beam 60. The measurement apparatus 1 can thereby not only detect whether the third layer 53 is present between the first layer 51 and the second layer 52, but can also calculate the area over which the third layer 53 spreads with high accuracy. If A1 is 0, the measurement apparatus 1 may calculate the area over which the electromagnetic wave beam 60 spreads as the area over which the third layer 53 spreads. The area over which the third layer 53 spreads corresponds to the area over which the first layer 51 and the third layer 53 are in contact.

Figure 9:
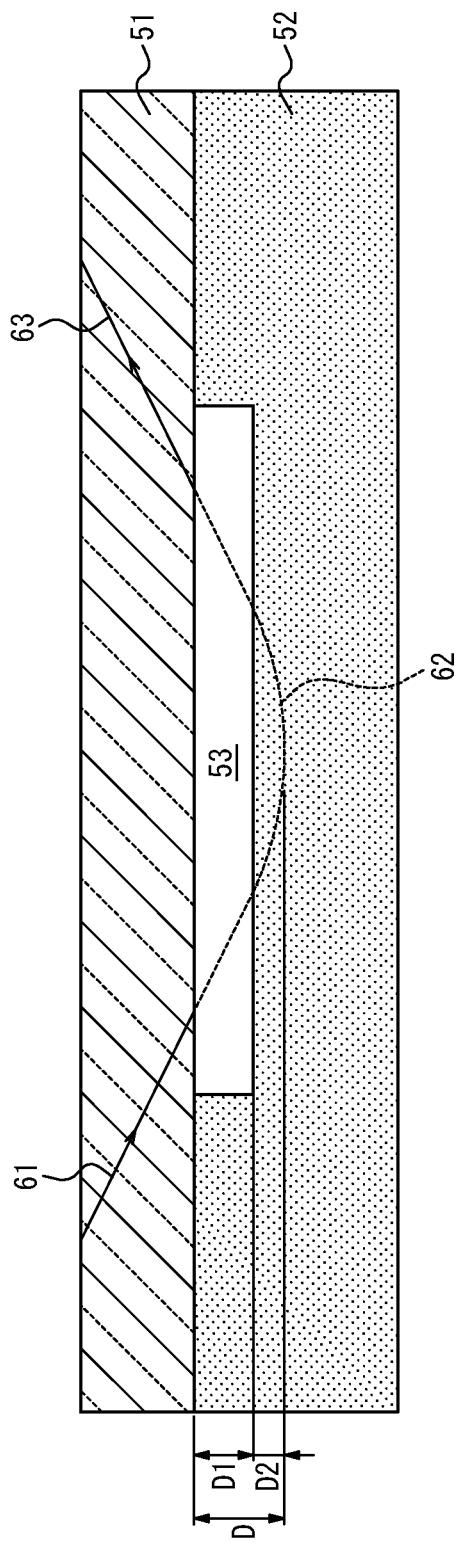
FIG. 9 is a cross-sectional diagram illustrating an example of a configuration in which an evanescent field seeps across third and second layers that are aligned in the depth direction of a sample.

As illustrated in FIG. 9, when the thickness of the third layer 53 is smaller than the seeping depth of the evanescent wave 62, the absorption spectrum of the electromagnetic wave is affected by the absorption due to the second layer 52. For example, the seeping depth of the evanescent wave 62 of an electromagnetic wave whose frequency is v2 is represented by D. The thickness of the third layer 53 is represented by D1. If D is greater than D1, the evanescent wave 62 seeps into the second layer 52. When the evanescent wave 62 seeps into the second layer 52, the seeping depth is represented by D2, which is calculated as the difference between D and D1.

The intensity of the evanescent wave 62 decreases exponentially with depth from the surface of the third layer 53. The higher the frequency of the electromagnetic wave is, the more the intensity of the evanescent wave 62 tends to decrease. The more the intensity of the evanescent wave 62 tends to decrease, the smaller the seeping depth of the evanescent wave 62 becomes. The seeping depth of the evanescent wave 62 can be expressed as a function of the frequency of the electromagnetic wave. Since the seeping depth is a function of frequency, the seeping depth of the evanescent wave 62 into the second layer 52 varies depending on the frequency of the electromagnetic wave. In some cases, the evanescent wave 62 may not seep into the second layer 52.

Figure 10:
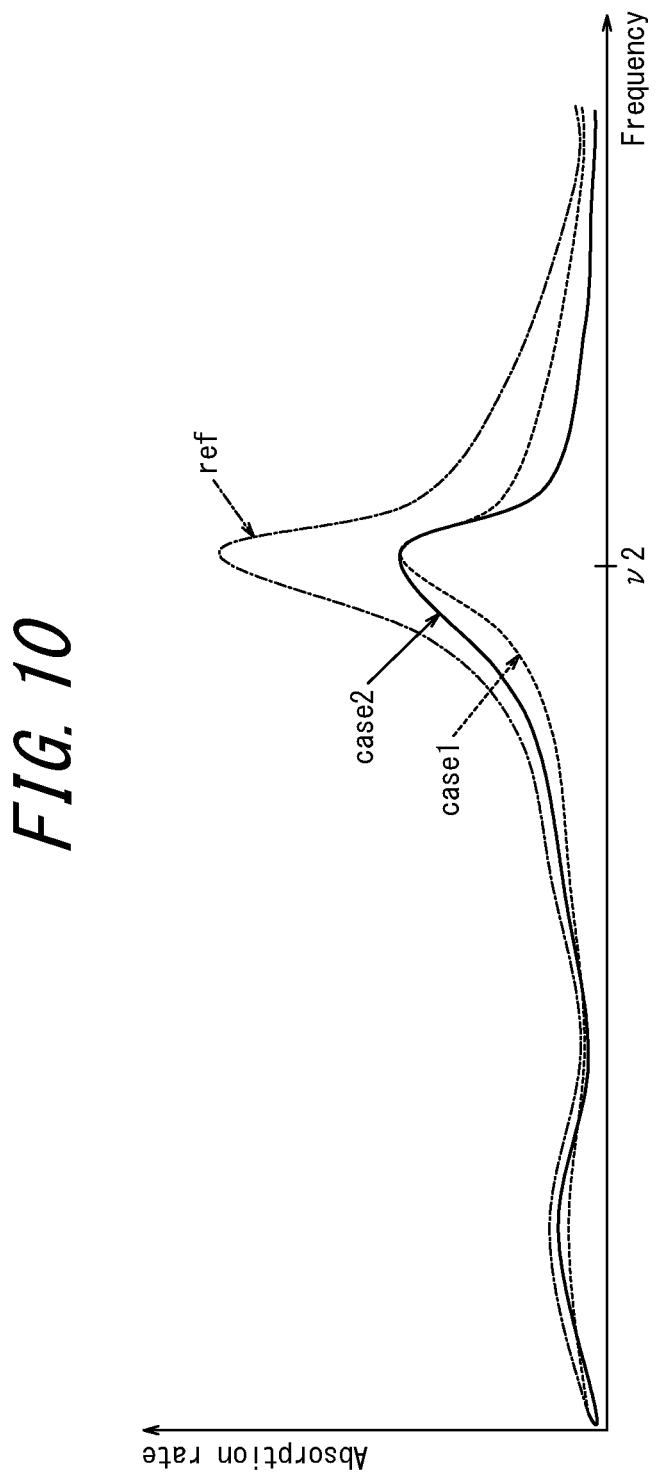
FIG. 10 is a graph illustrating an example of the total reflection absorption spectrum measured by the configuration example in FIG. 9.

The absorption rate of the electromagnetic wave is determined based on the depth at which the evanescent wave 62 seeps into the second layer 52. The total reflection absorption spectrum for the case of the evanescent wave 62 seeping across the third layer 53 and the second layer 52 that are aligned in the depth direction corresponds to the absorption rate of the total reflection absorption spectrum of the second layer 52, changed by a predetermined multiplication factor for each frequency. The case of the evanescent wave 62 seeping across the third layer 53 and the second layer 52 that are aligned in the depth direction is referred to as case 2. FIG. 10 illustrates the total reflection absorption spectrum for case 2. The horizontal and vertical axes of the graph in FIG. 8 are the same as the horizontal and vertical axes of the graph in FIG. 4. The total reflection absorption spectra for ref and case 1 are the same spectra as the total reflection absorption spectra for ref and case 1 illustrated in FIG. 8.

The graph in FIG. 10 is normalized so that the absorption rates of electromagnetic waves whose frequency is v2 match between case 1 and case 2. At frequencies higher than v2, the absorption rate of case 2 is smaller than the absorption rate of case 1 due to the smaller seeping depth of the evanescent wave 62. On the other hand, at frequencies lower than v2, the absorption rate of case 2 is greater than the absorption rate of case 1 due to the greater seeping depth of the evanescent wave 62. The multiplication factor with respect to the absorption rate of ref at each frequency differs between case 1 and case 2. The measurement apparatus 1 can calculate the thickness of the third layer 53 and the area of the third layer 53 based on the multiplication factor, with respect to the absorption rate of ref, of the absorption rate at each frequency. The measurement apparatus 1 may simultaneously calculate the thickness of the third layer 53 and the area of the third layer 53 based on one total reflection absorption spectrum. As described above, the change in the absorption rate corresponding to the magnitude of the area of the third layer 53 is not frequency dependent. The change in the absorption rate corresponding to the thickness of the third layer 53 is frequency dependent. By considering whether there is frequency dependence, the area and thickness of the third layer 53 can be calculated simultaneously in a predetermined measurement area on which the electromagnetic wave beam 60 is incident. The time required to detect the third layer 53 can be reduced as a result of the area and thickness of the third layer 53 being calculated simultaneously. Furthermore, in a predetermined measurement area, the third layer 53 has different thicknesses on a microscopic level. The measurement apparatus 1 may calculate the average value of the thickness of the third layer 53 within the predetermined measurement area.

By calculating the area or thickness of the third layer 53, the measurement apparatus 1 can improve the detection accuracy of the third layer 53. The measurement apparatus 1 can thereby improve the measurement accuracy of the state of adhesion between the first layer 51 and the second layer 52.

<Scanning of Surface of Sample 50>

Figure 11:
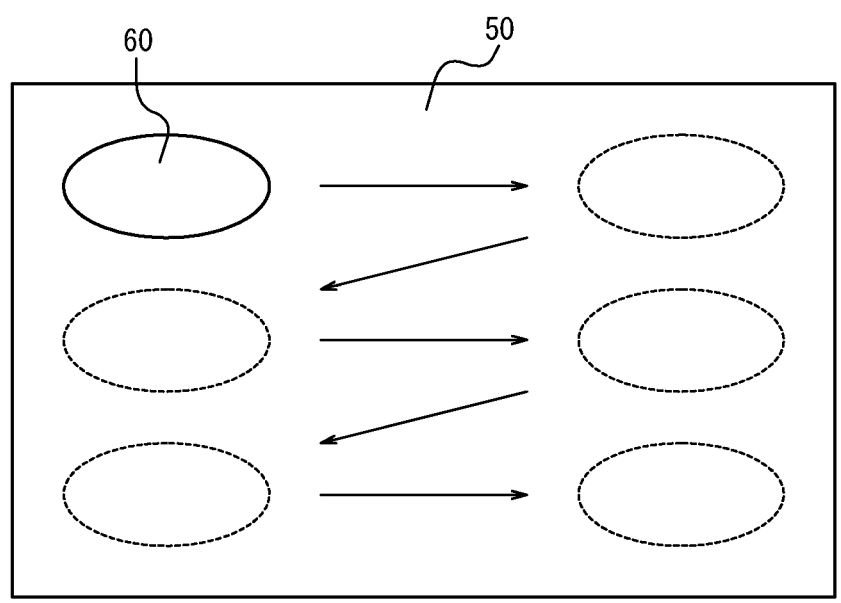
FIG. 11 is a plan view illustrating an example of scanning a sample in the in-plane direction.

As illustrated in FIG. 11, the measurement apparatus 1 may scan an electromagnetic wave beam 60, having a predetermined spread, along the surface of the sample 50. By scanning in the plane of the sample 50 with the electromagnetic wave beam 60, the measurement apparatus 1 can calculate the distribution of the third layer 53 in the plane of the sample 50. The measurement apparatus 1 can also calculate the area where the third layer 53 extends in the plane of the sample 50 with high accuracy. Furthermore, the measurement apparatus 1 can calculate the distribution of the thickness of the third layer 53 in the plane of the sample 50. The measurement apparatus 1 may map the distribution of the third layer 53 in the plane of the sample 50. The measurement apparatus 1 may perform a raster scan on the surface of the sample 50, or may scan the surface of the sample 50 by another method.

By scanning the surface of the sample 50, the measurement apparatus 1 of the present embodiment can measure the distribution of voids contained in the sample 50. The measurement apparatus 1 can thereby measure the distribution of the state of adhesion between the first layer 51 and the second layer 52.

<Flowchart of Measurement Method>

Figure 12:
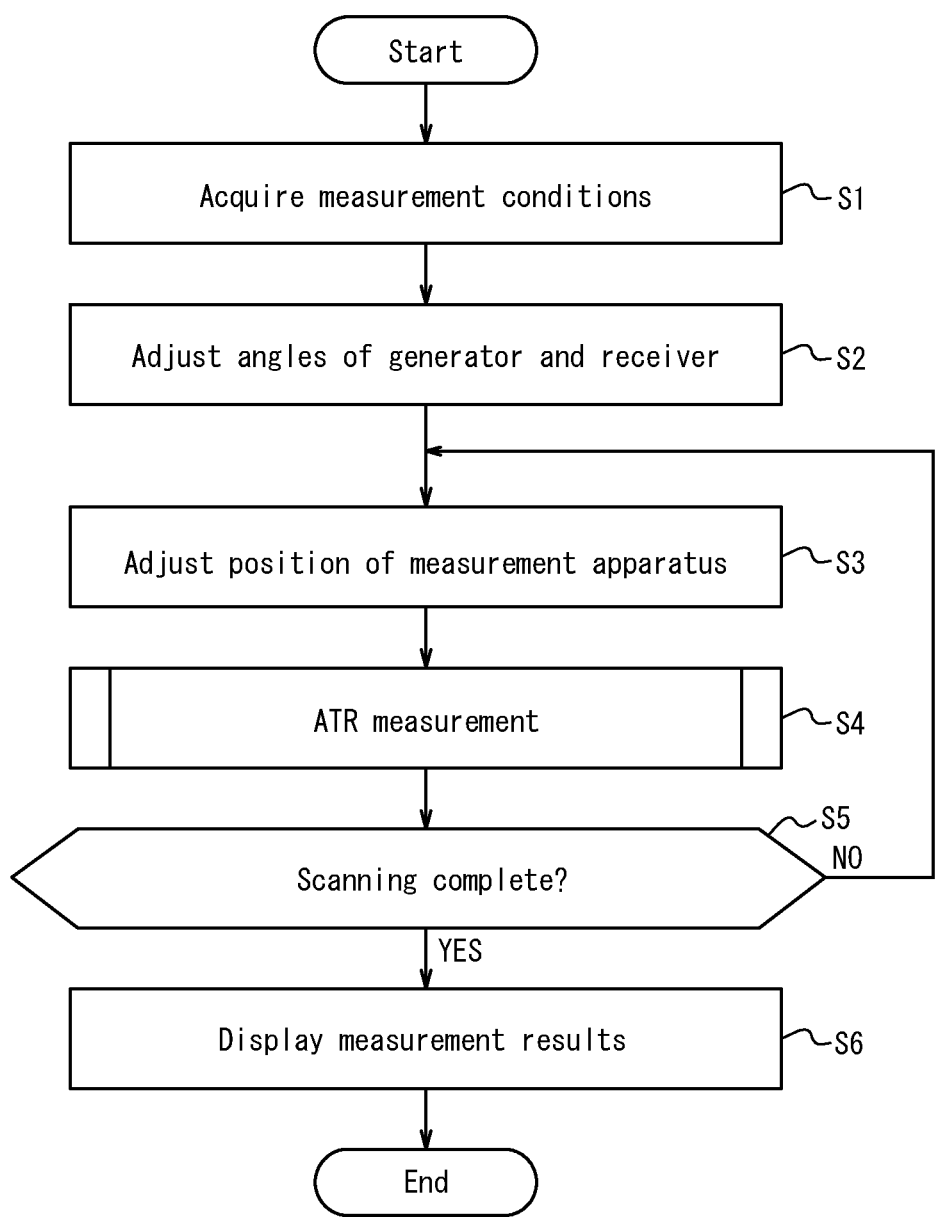
FIG. 12 is a flowchart illustrating example procedures of a measurement method according to an embodiment.

The measurement apparatus 1 may execute a measurement method that includes the procedures of the example flowchart in FIG. 12. The procedures illustrated in FIG. 12 may be implemented as a measurement program to be executed by the measurement apparatus 1.

The controller 10 acquires measurement conditions (step 51). The measurement conditions may include the type or physical property parameters of the materials forming the first layer 51 and the second layer 52. The physical property parameters of the material may include the refractive index. The measurement conditions may include the thickness of the first layer 51.

The controller 10 adjusts the angles of the generation device and reception device based on the measurement conditions (step S2). The controller 10 adjusts the angle of the generation device so that the electromagnetic wave incident from the first layer 51 on the second layer 52 is totally reflected. The controller 10 adjusts the angle of the reception device to match the angle of the generator 20.

The controller 10 adjusts the position of the measurement apparatus 1 above the surface of the sample 50 (step S3). The controller 10 may move the measurement apparatus 1 by controlling moving means such as the tires 3. The controller 10 may adjust the position of the measurement apparatus 1 based on a map designated in advance.

The controller 10 performs measurement by the ATR method at the current position of the measurement apparatus 1 (step S4). Measurement by the ATR method is referred to as ATR measurement. The procedures for ATR measurement are described below.

The controller 10 judges whether scanning over the surface of the sample 50 is complete (step S5). When the scanning is not complete (step S5: NO), the controller 10 returns to the procedure of step S3. When the scanning is complete (step S5: YES), the controller 10 advances to the procedure of step S6.

The controller 10 displays the measurement results of the sample 50 (step S6). After the procedure of step S6, the controller 10 ends execution of the procedures of the flowchart in FIG. 12.

Figure 13:
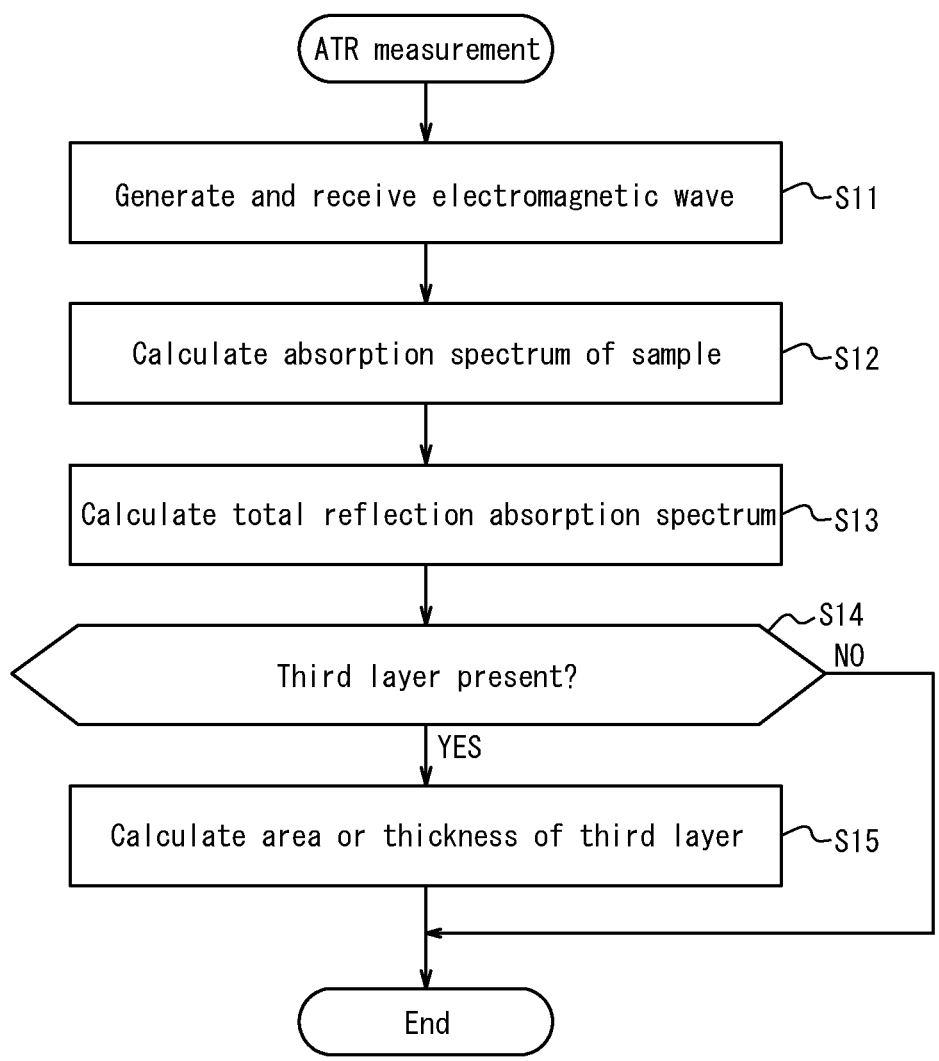
FIG. 13 is a flowchart illustrating an example of procedures for detecting the third layer.

The controller 10 may perform the ATR measurement of step S4 in FIG. 12 according to the procedures of the flowchart in FIG. 13.

The controller 10 generates an electromagnetic wave, causes the electromagnetic wave to be incident on the sample 50, and receives the electromagnetic wave reflected from the sample 50 (step S11). The controller 10 controls the generation device to generate the electromagnetic wave and causes the electromagnetic wave to be incident on the sample 50 at a predetermined angle. The electromagnetic wave incident on the sample 50 is reflected within the sample 50 and is emitted toward the reception device. The controller 10 acquires the measurement results of the intensity of the electromagnetic wave received by the reception device.

The controller 10 calculates the absorption spectrum of the sample 50 (step S12). The controller 10 can calculate the absorption spectrum of the sample 50 based on the difference between the spectrum of the electromagnetic wave generated by the generation device and the spectrum of the electromagnetic wave received by the reception device. The controller 10 may acquire, in advance, the spectrum of the electromagnetic wave generated by the generation device.

The controller 10 calculates the total reflection absorption spectrum (step S13). Based on the absorption spectrum of the sample 50 and the absorption spectrum of the first layer 51, the controller 10 can calculate the total reflection absorption spectrum of the second layer 52, the total reflection absorption spectrum of the third layer 53, or the total reflection absorption spectrum at a surface that includes both the second layer 52 and the third layer 53. The controller 10 may acquire the absorption spectrum of the first layer 51 in advance.

The controller 10 judges whether the third layer 53 is present between the first layer 51 and the second layer 52 based on the total reflection absorption spectrum (step S14). The controller 10 may judge whether the third layer 53 is present based on the calculation result of the total reflection absorption spectrum and the total reflection absorption spectrum of the second layer 52. The controller 10 may, for example, judge that the third layer 53 is not present when the calculation result for the total reflection absorption spectrum matches the total reflection absorption spectrum of the second layer 52. The controller 10 may, for example, judge that the third layer 53 is present when the difference between the calculation result for the total reflection absorption spectrum and the total reflection absorption spectrum of the second layer 52 is equal to or greater than a predetermined value.

When the controller 10 judges that the third layer 53 is not present (step S14: NO), the controller 10 ends execution of the procedures of the flowchart in FIG. 13 and returns to the procedure of step S5 in FIG. 12. When the controller 10 judges that the third layer 53 is present (step S14: YES), the controller 10 calculates the area or thickness of the third layer 53 based on the total reflection absorption spectrum (step S15). After step S15, the controller 10 ends execution of the procedures of the flowchart in FIG. 13 and returns to the procedure of step S5 in FIG. 12.

According to the measurement method of the present embodiment, the third layer 53 is detected with high accuracy. The measurement accuracy of the state of adhesion between the first layer 51 and the second layer 52 thereby improves.

<Determination of Contact State or Tightly Adhered State>

As described above, the measurement apparatus 1 of the present embodiment can judge whether the third layer 53 is present between the first layer 51 and the second layer 52 and calculate the area or thickness of the third layer 53. Here, even when no third layer 53 is present between the first layer 51 and the second layer 52, the adhesive strength between the first layer 51 and the second layer 52 might be less than a predetermined strength. The state in which the third layer 53 is present between the first layer 51 and the second layer 52 will be referred to as a partial contact state. The state in which the third layer 53 is not present, but the adhesive strength between the first layer 51 and the second layer 52 is less than a predetermined strength, will be referred to as a full contact state. The state in which the third layer 53 is not present, and the adhesive strength between the first layer 51 and the second layer 52 is equal to or greater than a predetermined strength, will be referred to as a tightly adhered state.

When the sample 50 is in the full contact state, a void as the third layer 53 can form by at least one of the first layer 51 and the second layer 52 being displaced in a direction away from the other. When the sample 50 is in the tightly adhered state, a void as the third layer 53 does not form even if at least one of the first layer 51 and the second layer 52 is displaced in a direction away from the other. By using the displacer 40 to displace at least one of the first layer 51 and the second layer 52 in a direction away from the other, the measurement apparatus 1 can determine whether the sample 50 is in the full contact state or the tightly adhered state.

The displacer 40 may displace the first layer 51 with respect to the second layer 52 by applying a force to the first layer 51 in a direction such that the first layer 51 moves away from the second layer 52 and the substrate 55. When the second layer 52 is elastic, the first layer 51 can be displaced with respect to the second layer 52 regardless of whether a void is formed between the first layer 51 and the second layer 52. The displacer 40 may apply a force equal to or greater than a predetermined value so that a void is formed in a portion where the adhesive strength between the first layer 51 and the second layer 52 is less than a predetermined strength. The displacer 40 may displace the second layer 52 with respect to the first layer 51 by applying a force to the second layer 52 or the substrate 55 in a direction such that the second layer 52 moves away from the first layer 51. The displacer 40 may displace at least one of the first layer 51 and the second layer 52 in a direction away from the other by applying a force to at least one of the first layer 51 and the second layer 52 in a direction away from the other.

The displacer 40 may vibrate the sample 50. The displacer 40 may include an ultrasonic wave generating element that vibrates the sample 50 by ultrasonic waves. The displacer 40 may include a vibrating element such as a piezoelectric element. The displacer 40 may include a striker that causes the sample 50 to vibrate by striking the sample 50. The displacer 40 may vibrate the sample 50 so that at least one of the first layer 51 and the second layer 52 vibrates. The displacer 40 may vibrate the sample 50 so that the phase of vibration of the first layer 51 differs from the phase of vibration of the second layer 52 and the substrate 55. The displacer 40 may vibrate the sample 50 so that the amplitude of the first layer 51 differs from the amplitude of the second layer 52 and the substrate 55. In this way, at least one of the first layer 51 and the second layer 52 can be displaced in a direction away from the other. The displacer 40 may vibrate the sample 50 so that a void is formed in the portion where the adhesive strength between the first layer 51 and the second layer 52 is less than a predetermined strength.

The first layer 51, the second layer 52, and the substrate 55 each have a unique resonance frequency. When the resonance frequency of the first layer 51 and the resonance frequency of the second layer 52 differ, the displacer 40 can easily cause the phase of vibration of the first layer 51 and the phase of vibration of the second layer 52 to differ. When the second layer 52 vibrates together with the substrate 55, the displacer 40 can easily cause the phase of vibration of the first layer 51 and the phase of vibration of the second layer 52 to differ based on the difference between the resonance frequency of the first layer 51 and the resonance frequency of the substrate 55. When the resonance frequency of the first layer 51 differs from the resonance frequency of the second layer 52 or the substrate 55, the displacer 40 may vibrate the sample 50 at the resonance frequency of the first layer 51 and increase the amplitude of the first layer 51. The displacer 40 may vibrate the sample 50 at the resonance frequency of the second layer 52 or the substrate 55 and increase the amplitude of the second layer 52 or the substrate 55.

Figure 14:
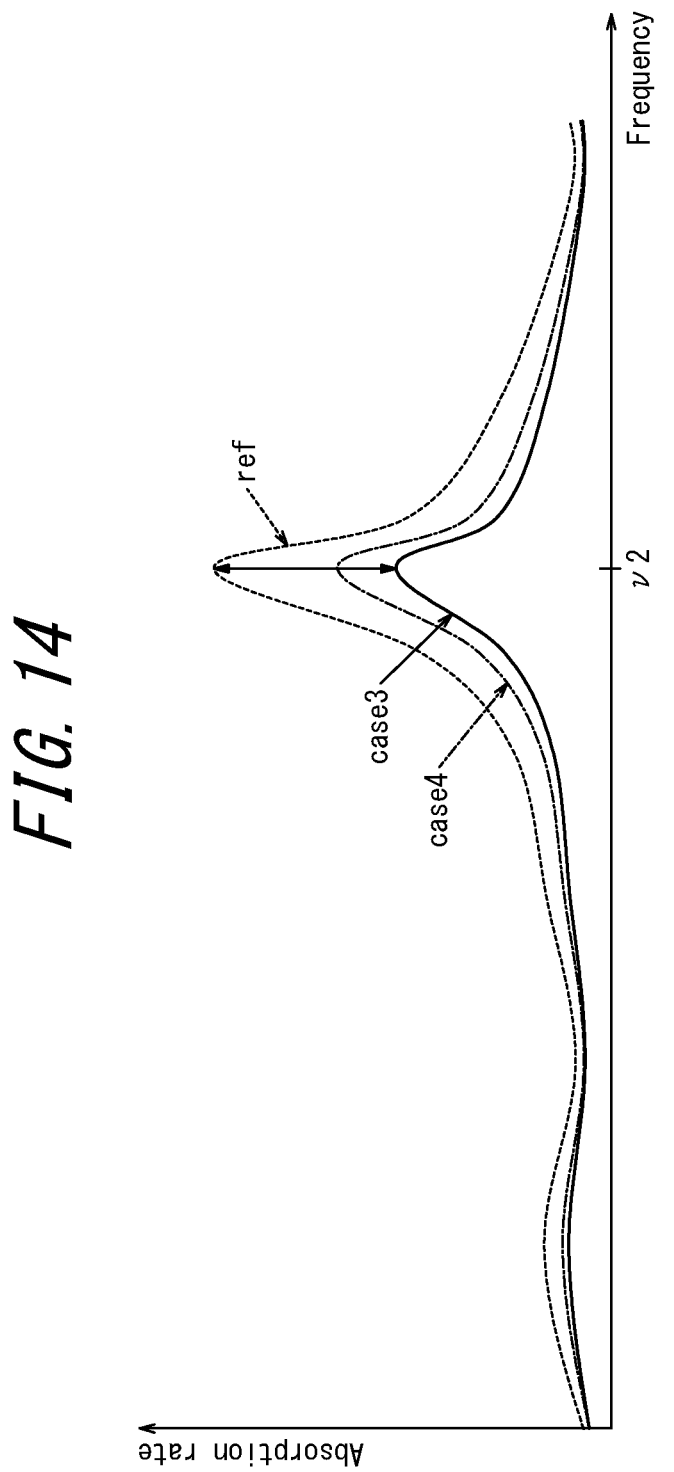
FIG. 14 is a graph illustrating an example of the total reflection absorption spectrum measured when a displacer displaces the first layer.

The controller 10 may measure the absorption spectrum of the sample 50 and calculate the total reflection absorption spectrum while displacing the first layer 51 with the displacer 40. The controller 10 may calculate the total reflection absorption spectrum at various times while the first layer 51 is being displaced. The case in which the displacement of the first layer 51 is maximized is referred to as case 3. The case in which the displacement of the first layer 51 is between zero and the maximum is referred to as case 4. FIG. 14 illustrates the total reflection absorption spectra for case 3 and case 4. The horizontal and vertical axes of the graph in FIG. 14 are the same as the horizontal and vertical axes of the graph in FIG. 4. The total reflection absorption spectrum for ref is the same spectrum as the total reflection absorption spectrum for ref illustrated in FIG. 4. Based on the total reflection absorption spectrum for case 3, which is the timing when the displacement of the first layer 51 is maximized, the controller 10 may judge whether the third layer 53 is present and may calculate the area or thickness of the third layer 53. Based on the total reflection absorption spectrum for case 4, the controller 10 may estimate the total reflection absorption spectrum at the timing when the displacement of the first layer 51 is maximized. Based on the estimated total reflection absorption spectrum, the controller 10 may judge whether the third layer 53 is present and may calculate the area or thickness of the third layer 53.

When the displacer 40 applies a force to the first layer 51, the controller 10 may measure the absorption spectrum of the sample 50 at the time the force applied by the displacer 40 is maximized. The absorption spectrum at the time when the maximum force is applied to the first layer 51 can be considered the absorption spectrum of the sample 50 at the timing when the displacement of the first layer 51 is maximized. By including a configuration in which the displacer 40 applies a force to the first layer 51, the controller 10 can calculate the total reflection absorption spectrum for case 3 with high accuracy. The measurement apparatus 1 can thereby improve the accuracy of judging whether the state of adhesion between the first layer 51 and the second layer 52 is a full contact state or a tightly adhered state.

When the displacer 40 vibrates the sample 50, the controller 10 may measure an absorption spectrum of the sample 50 over a predetermined period of time. Based on the result of measuring the absorption spectrum of the sample 50 within the predetermined period of time, the controller 10 may judge the timing at which the displacement of the first layer 51 was maximized. The controller 10 may judge whether the third layer 53 is present based on the absorption spectrum of the sample 50 at the timing when the displacement of the first layer 51 was maximized. The controller 10 may judge whether the third layer 53 is present based on the absorption spectrum for which the absorption rate at a predetermined frequency was minimized. By including a configuration in which the displacer 40 vibrates the sample 50, the controller 10 can calculate the total reflection absorption spectrum for case 3. The measurement apparatus 1 can thereby determine, with a simple configuration, whether the state of adhesion between the first layer 51 and the second layer 52 is a full contact state or a tightly adhered state.

<Flowchart>

Figure 15:
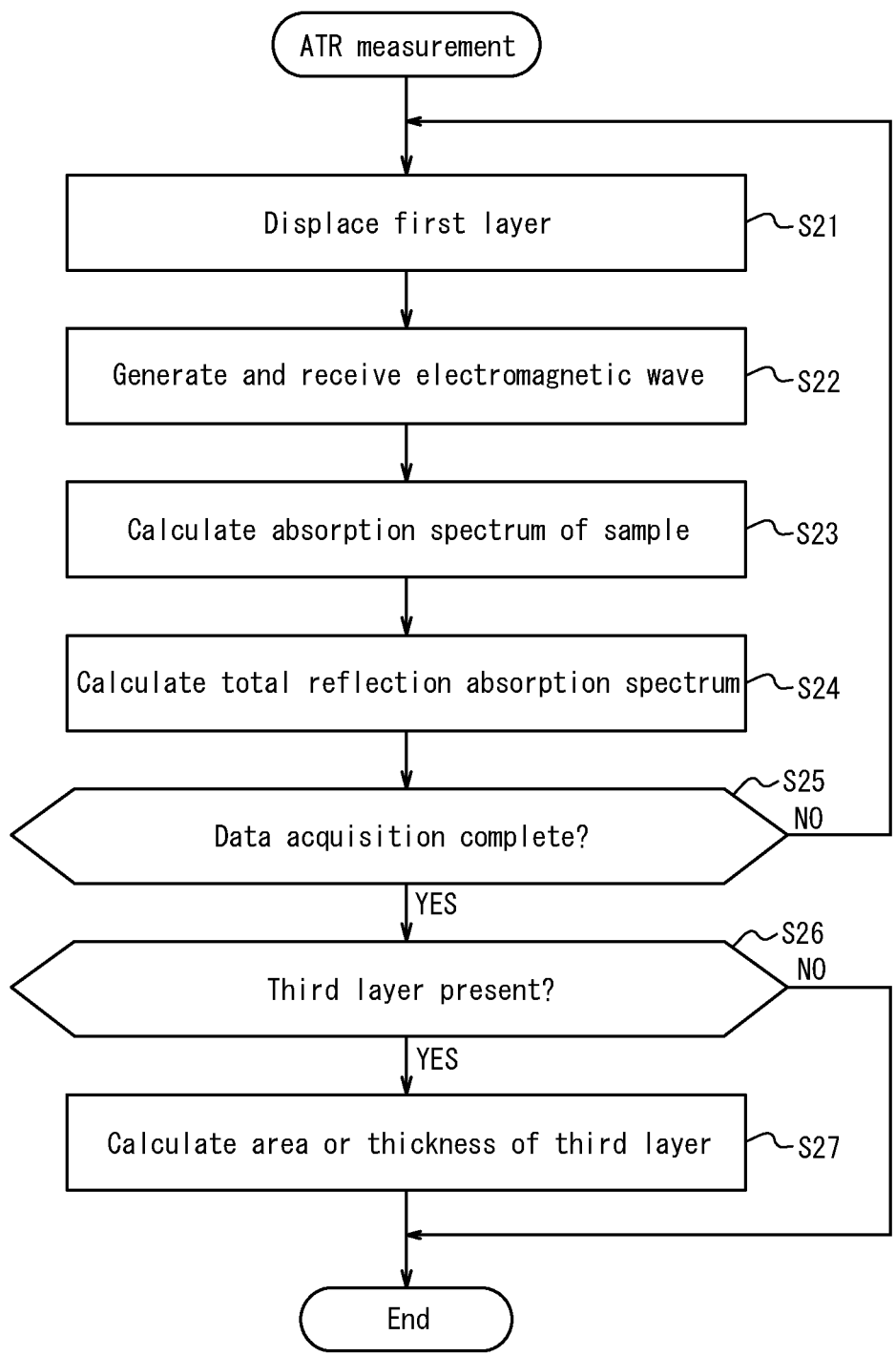
FIG. 15 is a flowchart illustrating an example of procedures for detecting the third layer while displacing the first layer.

The controller 10 may perform the procedures of the flowchart in FIG. 15, including the procedure by which the displacer 40 displaces the first layer 51, as the ATR measurement performed in step S4 of FIG. 12.

The displacer 40 displaces the first layer 51 (step S21). In other words, the controller 10 controls the displacer 40 so that the first layer 51 is displaced with respect to the second layer 52.

The controller 10 generates an electromagnetic wave, causes the electromagnetic wave to be incident on the sample 50, and receives the electromagnetic wave reflected from the sample 50 (step S22). The controller 10 may execute a procedure that is the same as or similar to the procedure of step S11 in FIG. 12.

The controller 10 calculates the absorption spectrum of the sample 50 (step S23). The controller 10 may execute a procedure that is the same as or similar to the procedure of step S12 in FIG. 12.

The controller 10 calculates the total reflection absorption spectrum (step S24). The controller 10 may execute a procedure that is the same as or similar to the procedure of step S13 in FIG. 12.

The controller 10 judges whether data acquisition is complete (step S25). The controller 10 may judge that data acquisition is complete when the presence of the third layer 53 can be judged based on the total reflection absorption spectrum calculated in the procedures of steps S21 to S24. The controller 10 may judge that data acquisition is complete when the calculated total reflection absorption spectrum corresponds to the total reflection absorption spectrum for case 3 in FIG. 14, or when the total reflection absorption spectrum for case 3 can be estimated based on the calculated total reflection absorption spectrum.

When the controller 10 does not judge that data acquisition is complete (step S25: NO), the controller 10 returns to the procedure of step S21 and continues to calculate the total reflection absorption spectrum. When the controller 10 judges that data acquisition is complete (step S25: YES), the controller 10 judges whether the third layer 53 is present based on the calculated total reflection absorption spectrum (step S26). The controller 10 may execute a procedure that is the same as or similar to the procedure of step S14 in FIG. 12.

When the controller 10 judges that the third layer 53 is not present (step S26: NO), the controller 10 ends execution of the procedures of the flowchart in FIG. 15 and returns to the procedure of step S5 in FIG. 12. When the controller 10 judges that the third layer 53 is present (step S26: YES), the controller 10 calculates the area or thickness of the third layer 53 based on the total reflection absorption spectrum (step S27). After step S27, the controller 10 ends execution of the procedures of the flowchart in FIG. 15 and returns to the procedure of step S5 in FIG. 12.

As described above, the measurement apparatus 1 of the present embodiment can determine whether the sample 50 is in a full contact state or a tightly adhered state by displacing the first layer 51 with the displacer 40. The state of adhesion of the sample 50 can thereby be detected with high accuracy.

In analysis using a general ATR method, a prism having a high refractive index is used for electromagnetic waves to be incident on the analysis target. In the present embodiment, the refractive index of the first layer 51 is larger than the refractive index of the second layer 52, enabling the first layer 51 to function as a prism. The measurement apparatus 1 in the present embodiment can be considered as analyzing the second layer 52 by the ATR method, using the first layer 51 as a prism. The measurement apparatus 1 can also be considered as analyzing the proportion of the third layer 53 within the second layer 52.

(Example for Case of n1<n2)

In the above embodiment, the case of assuming that n1>n2 holds has been described. The measurement apparatus 1 can also judge whether the third layer 53 is present when the refractive index of the first layer 51 is smaller than the refractive index of the second layer 52, that is, when n1<n2 holds.

Figure 16:
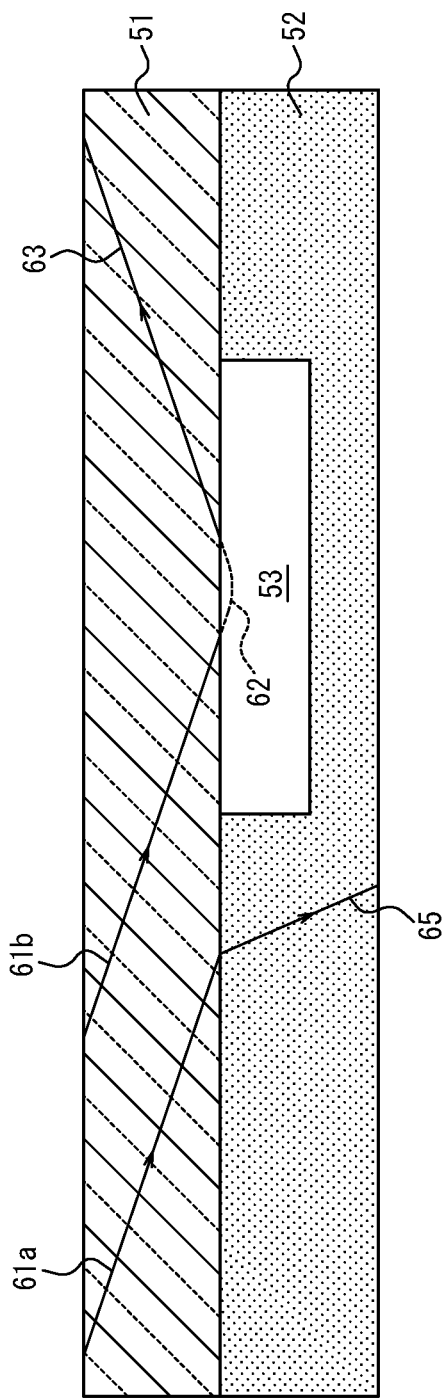
FIG. 16 is a cross-sectional diagram illustrating an example of electromagnetic wave progression when the refractive index of the first layer is smaller than the refractive index of the second layer.

When the refractive index of the first layer 51 is smaller than the refractive index of the second layer 52, an incident electromagnetic wave 61a traveling from the first layer 51 to the second layer 52 is not totally reflected at the surface of the second layer 52, as illustrated in FIG. 16. Although a portion of the incident electromagnetic wave 61a is reflected at the surface of the second layer 52, the majority of the incident electromagnetic wave 61a travels into the second layer 52 as a refracted electromagnetic wave 65. On the other hand, when the third layer 53 is present, the incident electromagnetic wave 61b that travels from the first layer 51 to the third layer 53 is totally reflected on the surface of the third layer 53 and is emitted from the first layer 51 as a reflected electromagnetic wave 63. In other words, the intensity of the electromagnetic wave that can be received by the receiver 30 differs greatly between the case in which the third layer 53 is present and the case in which the third layer 53 is not present. The measurement apparatus 1 may judge that the third layer 53 is present when the intensity of the electromagnetic wave received by the receiver 30 is equal to or greater than a predetermined value. The measurement apparatus 1 may calculate the area or thickness of the third layer 53 based on the intensity of the electromagnetic wave.

The measurement apparatus 1 may operate by selecting between a mode for receiving electromagnetic waves totally reflected by both the second layer 52 and the third layer 53 and a mode for receiving electromagnetic waves totally reflected by the third layer 53 only, based on the magnitude relationship between the refractive index of the first layer 51 and the refractive index of the second layer 52. The measurement apparatus 1 may acquire the respective refractive indices of the first layer 51 and the second layer 52 by, for example, accepting input of measurement conditions, and may judge the magnitude relationship between the refractive indices. The measurement apparatus 1 may change the method of judging whether the third layer 53 is present or of calculating the area or thickness of the third layer 53 in accordance with the mode of operation.

Even when n1>n2 holds, the incident electromagnetic wave 61 is not totally reflected on the surface of the second layer 52 when incident from the first layer 51 on the second layer 52 at an angle smaller than the critical angle $\theta_{C12}$. Conversely, the incident electromagnetic wave 61 is totally reflected on the surface of the third layer 53 when incident from the first layer 51 toward the third layer 53 at an angle greater than the critical angle $\theta_{C13}$. In other words, in the case of $\theta_{C13} > \theta_{C12}$, the measurement apparatus 1 may operate in the mode of receiving the electromagnetic wave that is totally reflected only by the third layer 53 when the angle of incidence of the incident electromagnetic wave 61 is larger than $\theta_{C12}$ and smaller than $\theta_{C13}$.

The measurement apparatus 1 may further receive electromagnetic waves simply reflected on the surface of the second layer 52, even when operating in the mode of receiving electromagnetic waves totally reflected only by the third layer 53. The measurement apparatus 1 may calculate the reflectance of the electromagnetic wave at the surface of the second layer 52 by receiving the electromagnetic wave simply reflected on the surface of the second layer 52. The reflectance of an electromagnetic wave depends on the frequency of the electromagnetic wave. The relationship between the frequency and the reflectance of the electromagnetic wave at each frequency is expressed as a reflection spectrum. The measurement apparatus 1 may judge whether the third layer 53 exists, and calculate the area or thickness of the third layer 53, based not only on the total reflection absorption spectrum but also on the reflection spectrum.

Embodiments of the present disclosure have been described with reference to the drawings, but specific configurations are not limited to these embodiments, and a variety of modifications may be made without departing from the spirit and scope thereof.

The invention claimed is:

1. A measurement apparatus comprising:
   a generator configured to cause an electromagnetic wave to be incident on a sample comprising a first layer and a second layer that are stacked, the electromagnetic wave being incident on the first layer;
   a receiver configured to receive an electromagnetic wave reflected by the sample; and
   a controller configured to control the generator and the receiver and
   detect whether a third layer is present between the first layer and the second layer based on the electromagnetic wave incident on the sample from the generator and the electromagnetic wave received by the receiver, wherein
   the generator is configured to cause the electromagnetic wave to be incident at an angle such that the electromagnetic wave is totally reflected between the first layer and the third layer and/or between the first layer and the second layer, and
   the controller is configured to detect whether the third layer is present based on a difference between absorption rates, in the second layer and in the third layer, of an evanescent wave produced when the electromagnetic wave is totally reflected.

2. The measurement apparatus of claim 1, further comprising a displacer configured to displace at least one of the first layer and the second layer in a direction away from the other.

3. The measurement apparatus of claim 2, wherein the displacer is configured to vibrate at least one of the first layer and the second layer.

4. The measurement apparatus of claim 2, wherein the displacer is configured to apply a force to at least one of the first layer and the second layer in a direction away from the other.

5. The measurement apparatus of claim 1, wherein the controller is configured to calculate an area over which the first layer and the third layer are in contact based on the electromagnetic wave incident on the sample from the generator and the electromagnetic wave received by the receiver.

6. The measurement apparatus of claim 1, wherein the controller is configured to calculate a thickness of the third layer based on the electromagnetic wave incident on the sample from the generator and the electromagnetic wave received by the receiver.

7. The measurement apparatus of claim 1, wherein the controller is configured to simultaneously calculate an area over which the first layer and the third layer are in contact and a thickness of the third layer based on the electromagnetic wave incident on the sample from the generator and the electromagnetic wave received by the receiver.

8. The measurement apparatus of claim 1, further comprising at least one of an incidence angle adjuster located between the generator and the first layer and an exit angle adjuster located between the receiver and the first layer.

9. A measurement method comprising:
   causing an electromagnetic wave to be incident on a sample comprising a first layer and a second layer that are stacked, the electromagnetic wave being incident on the first layer;
   receiving an electromagnetic wave reflected by the sample; and
   detecting whether a third layer is present between the first layer and the second layer based on the electromagnetic wave that is caused to be incident on the sample and the electromagnetic wave that is received, wherein
   the causing of the electromagnetic wave to be incident includes causing the electromagnetic wave to be incident on the first layer at an angle such that the electromagnetic wave is totally reflected between the first layer and the third layer and/or between the first layer and the second layer, and
   the detecting of whether the third layer is present includes detecting whether the third layer is present based on a difference between absorption rates, in the second layer and in the third layer, of an evanescent wave produced when the electromagnetic wave is totally reflected.

10. The measurement apparatus of claim 1, wherein the controller is configured to detect whether the third layer is present based further on a result of comparing a difference between the electromagnetic wave incident on the sample from the generator and the electromagnetic wave received by the receiver with an absorption spectrum when the electromagnetic wave is totally reflected between the first layer and the second layer.

11. The measurement apparatus of claim 2, wherein the controller is configured to calculate an area over which the first layer and the third layer are in contact based on the electromagnetic wave incident on the sample from the generator and the electromagnetic wave received by the receiver.

12. The measurement apparatus of claim 3, wherein the controller is configured to calculate an area over which the first layer and the third layer are in contact based on the electromagnetic wave incident on the sample from the generator and the electromagnetic wave received by the receiver.

13. The measurement apparatus of claim 4, wherein the controller is configured to calculate an area over which the first layer and the third layer are in contact based on the electromagnetic wave incident on the sample from the generator and the electromagnetic wave received by the receiver.

* * * * *